United States Patent
Kalhoff et al.

(10) Patent No.: US 9,760,076 B2
(45) Date of Patent: Sep. 12, 2017

(54) METHOD, CONTROL DEVICE AND CONTROL SYSTEM FOR THE CONTROL OF AN AUTOMATION SYSTEM

(75) Inventors: Johannes Kalhoff, Blomberg (DE); Dietmar Krumsiek, Emmerthal (DE)

(73) Assignee: Phoenix Contact GmbH & Co. KG, Blomberg (DE)

( * ) Notice: Subject to any disclaimer, the term of this patent is extended or adjusted under 35 U.S.C. 154(b) by 833 days.

(21) Appl. No.: 12/049,096

(22) Filed: Mar. 14, 2008

(65) Prior Publication Data

US 2008/0228290 A1    Sep. 18, 2008

(30) Foreign Application Priority Data

Mar. 14, 2007    (DE) .................. 10 2007 013 085

(51) Int. Cl.
| | | |
|---|---|---|
| G05B 19/05 | (2006.01) | |
| G05B 19/41 | (2006.01) | |
| G05B 19/418 | (2006.01) | |

(52) U.S. Cl.
CPC ..... *G05B 19/056* (2013.01); *G05B 19/41885* (2013.01); *G05B 2219/15074* (2013.01);
(Continued)

(58) Field of Classification Search
CPC ............ G05B 19/056; G05B 19/41885; G05B 2219/32126; G05B 2219/34038;
(Continued)

(56) References Cited

U.S. PATENT DOCUMENTS 5,565,748 A * 10/1996 Takizawa et al. ......... 318/568.1
6,088,621 A *  7/2000 Woytowitz et al. ............ 700/16
(Continued)

FOREIGN PATENT DOCUMENTS

| | | |
|---|---|---|
| DE | 10106504 A1 | 8/2002 |
| DE | 102004053264 A1 | 4/2006 |

(Continued)

OTHER PUBLICATIONS

Dipl.-Ing. Wigner, "DE Application No. 10 2008 014 153.4-55 Office Action", Jul. 17, 2009, Publisher: Deutsches Patent- und Markenamt, Published in: DE.

(Continued)

*Primary Examiner* — Jason Lin
(74) *Attorney, Agent, or Firm* — Kaplan Breyer Schwarz, LLP

(57) ABSTRACT

In order to be able, for control of an automation system, to project, establish, process and/or simulate device functions of the control devices used in a simple and flexible way, the invention provides a method by means of which at least one software module is made available in an execution environment (350) with a program function (301-305*b*, 311-315, 321*a*-324) that can be executed in the execution environment (350), where the program function (301-305*b*, 311-315, 321*a*-324) is a representative function of the device function (201-205*b*, 211-215) that is stored in an associated control device (101-105, 121-125) of the control system, the device function and the program function are at least partially identical, the device function comprises at least one first variable function parameter, and the program function comprises at least one second variable function parameter that is assigned to the first function parameter of the device function, the second function parameter is adjusted as a function of user inputs, the adapted second function parameter is transferred to the associated control device (101-105, 121-125) via a network (400), and the first function parameter is set at the value of the second function parameter. Furthermore, the invention provides a control device and control system that are designed to carry out the method.

17 Claims, 7 Drawing Sheets

Figure 1:
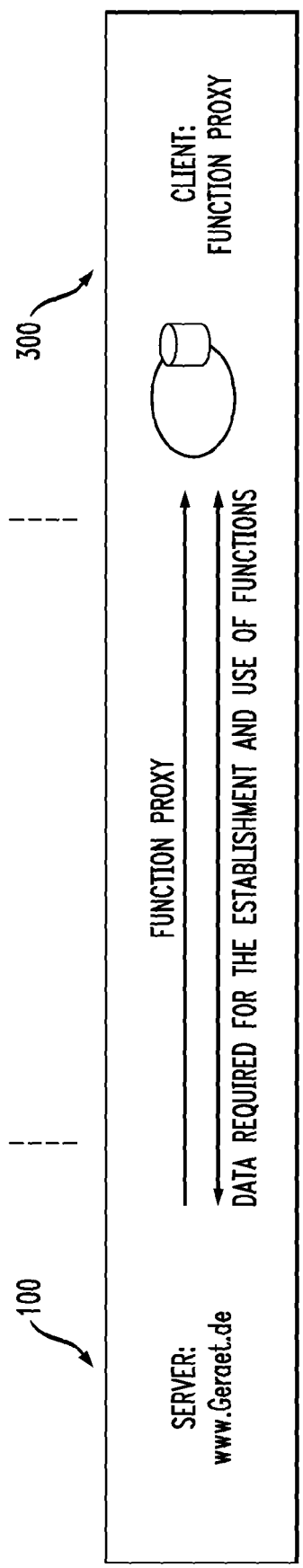

(52) U.S. Cl.
CPC .............. *G05B 2219/31422* (2013.01); *G05B 2219/32126* (2013.01); *G05B 2219/34038* (2013.01); *G05B 2219/34444* (2013.01); *Y02P 90/18* (2015.11); *Y02P 90/26* (2015.11)

(58) Field of Classification Search
CPC ........... G05B 2219/15074; G05B 2219/31422; G05B 2219/34444
USPC ............................................ 700/17, 1; 703/6
See application file for complete search history.

(56) References Cited

U.S. PATENT DOCUMENTS

| | | | | |
|---|---|---|---|---|
| 6,441,350 | B1* | 8/2002 | Stoddard et al. | 219/497 |
| 6,871,104 | B1* | 3/2005 | Lenhart et al. | 700/18 |
| 7,110,835 | B2* | 9/2006 | Blevins et al. | 700/83 |
| 7,200,448 | B2* | 4/2007 | Cachat et al. | 700/18 |
| 7,257,523 | B1* | 8/2007 | Nixon et al. | 703/13 |
| 7,283,934 | B2* | 10/2007 | Deller | B64F 5/0045 702/183 |
| 7,603,183 | B1* | 10/2009 | Munemoto | 700/17 |
| 2002/0099453 | A1* | 7/2002 | Tokimoto et al. | 700/17 |
| 2004/0044420 | A1* | 3/2004 | Dinges et al. | 700/17 |
| 2004/0078182 | A1* | 4/2004 | Nixon et al. | 703/22 |
| 2005/0060046 | A1* | 3/2005 | Ito et al. | 700/17 |
| 2005/0107897 | A1* | 5/2005 | Callaghan | 700/87 |
| 2005/0177252 | A1* | 8/2005 | Chernoff et al. | 700/17 |
| 2006/0155387 | A1 | 7/2006 | Pieronek | |
| 2006/0167667 | A1* | 7/2006 | Maturana et al. | 703/6 |
| 2006/0224250 | A1* | 10/2006 | Callaghan | 700/1 |
| 2006/0293768 | A1* | 12/2006 | Rogers et al. | 700/86 |
| 2007/0078526 | A1* | 4/2007 | Bromley et al. | 700/19 |
| 2007/0156255 | A1* | 7/2007 | Herrmann et al. | 700/17 |
| 2007/0208435 | A1* | 9/2007 | Schott | 700/17 |
| 2007/0244683 | A1* | 10/2007 | Cheng et al. | 703/13 |
| 2009/0018675 | A1* | 1/2009 | Sesay | 700/17 |

FOREIGN PATENT DOCUMENTS

| | | |
|---|---|---|
| EP | 1 276 026 A1 | 1/2003 |
| EP | 1 659 468 A2 | 5/2006 |
| EP | 1 710 639 A2 | 10/2006 |
| WO | 01/50284 A1 | 7/2001 |

OTHER PUBLICATIONS

Lumpp et al., "Virtual Java Devices Integration of fieldbus based systems in the Internet", "Industrial electronics society, 1998. IECON '98. Proceedings of the 24th Annual Conference of the IEEE Aachen, Germany Aug. 31-Sep. 4, 1998, NY, NY", , pp. 176-181, Publisher: IEEE; XP010308211, Published in: Germany.

Stefan Hristov, "European Office Action for International Application 08004863.0-1239", Mar. 29, 2010, Publisher: European Patent Office, Published in: EP.

"European Office Action for European International Application No. 08 004 863.0-1239", dated Feb. 15, 2011, Publisher: European Patent Office, Published in: EP.

\* cited by examiner

METHOD, CONTROL DEVICE AND CONTROL SYSTEM FOR THE CONTROL OF AN AUTOMATION SYSTEM

In automation technology, systems and devices today are typically configured and/or programmed by special projection systems. Accordingly, as a rule, special software packages are employed, which are usable for certain types of automation systems. Software tools are offered typically for control programming, for example, the programming of a machine application, the network configuration or the device configuration.

For example, standard IEC 61131 is known for control programming; for device configuration one can use, for example, the FDT/DTM (field-device-tool/device-type-manager) concept or web-based pages. Moreover, attempts are made to maintain the interoperability by standardizing interfaces, such as, for example, by device definitions for network components.

However, the disadvantage of the current solutions is that a multitude of components is needed, which components have to be installed in a computer, where the user surfaces with the given device function expand, and the user accordingly always must use the correct version of the user surface. Furthermore, the availability of the user surface for the entire life cycle is frequently problematic due to version differences at the time of replacement of a device, startup, servicing, etc. This problem is reinforced additionally by the usability of older user surfaces on newer computer systems.

The present invention is therefore based on the problem of providing an improved way of projecting, establishing, processing and/or simulating the device functions of the control devices that are used for the control of an automation system.

This problem is solved by a method according to Claim 1 and by a control device according to Claim 11. Advantageous embodiments and variants are the object of the corresponding dependent claims.

Thus, a method according to the invention is used for controlling an automation system, where one uses for the control a control system with, as a rule, a plurality of interconnected control devices, and where, in at least one control device, a control program with a predetermined device function is stored. According to this method at least one software module is made available in an execution environment with a program function that can be executed in the execution environment, where the program function is a representative function of the device function stored in the control device, the device function and the program function are at least partially identical, and the device function comprises at least one first variable function parameter and the program function at least one second variable function parameter, which is assigned to the first function parameter of the device function. Furthermore, according to the invention, the second function parameter is adapted as a function of user input data where the user inputs are made available by a user interface to the execution environment, the adapted second function parameter is transferred from the execution environment to the at least one control device via a network, and the first function parameter is set at the value of the second function parameter.

In the present patent application, the term control device is used for any device that participates in the control of a process of an automation system. Accordingly, the term control device denotes, for example, a sensor, an actor, a device for the input or output of process, parameter or control data, or a device for control, monitoring, protocoling, operating and/or observation of a process. Below, the term device is also used simply to denote such a control device.

The device function and/or the representative function stored in the control device can comprise components for the entire life cycle of the device, such as, for example, engineering, function, diagnosis and/or service components. Typically, the device and representative function are designed as software components, where the device function can be executed by the corresponding control device and the representative function within the execution environment. Thus, the method allows, via the representative function that proceeds outside the device, the intervention of the user on the device function throughout the entire life cycle. The functionality of the device function is enlarged advantageously by the representative function, for example, by functionalities to visualize process states or for user input.

Via the representative function, the current state of the associated device function can also be queried advantageously. Accordingly, the method comprises advantageously the steps of the transfer of the first function parameter from the at least one control device to the execution environment via the network, and the setting of the second function parameter at the value of the first function parameter.

As network, it is preferable to use an IP-based network, particularly the Internet. The execution environment is preferably designed as a web browser, or comprises one. A transfer of the first and/or second function parameter in this embodiment of the method occurs advantageously by means of standard web technologies, particularly by means of AJAX (Asynchronous JavaScript and XML). For this purpose, the control device advantageously has appropriate server functionalities.

The execution environment, in which the representative function is executed, can be arranged preferably in a computer system that is separate from the control system, or also in an additional control device.

The representative function, hereafter also called function proxy or clone function, and the device function present preferably at least one partially identical interface with data communication. In this way, the representative function can communicate with other representative and/or device functions, and thus can allow a simulation of the control system. Accordingly, the method advantageously comprises the step of the simulation of a functional proceeding of the control system within the execution environment, where the simulation of a functional proceeding comprises advantageously the execution of at least one program function, where the program function is a representative function of a device function that has been stored in a control device of the control system.

The simulation of a functional run comprises advantageously the exchange of data between at least two program functions, where the program functions in each case are representative functions of device functions that have been stored in at least two associated control devices.

Furthermore, the simulation of a functional run comprises advantageously the execution of at least one device function that has been stored in a control device of the control system, where input values of the device function are transferred from the execution environment to the control device via the network, and output values of the device function are transferred from the control device to the execution environment via the network.

Making available the representative function in the execution environment, respectively making available the software module that comprises the representative function, can be achieved in different ways depending on the application purpose. Thus, the representative function can be stored in the control device and read directly from it. The representative function can also be queried from the Internet via an Internet address that has been made available by the manufacturer of the control device or by a third party. For this purpose, it is advantageous to store an appropriate Internet address in the control device.

Furthermore, the representative function or software component that comprises the representative function, can be made available via storage media, such as, for example, a CD or a diskette, or as the result of a configuration process, also referred to as tooling.

A control device according to the invention of a control system for controlling an automation system comprises a memory in which a first program module is stored, where the first program module comprises at least one executable device function with at least one first variable function parameter, a processor unit for carrying out the first program module, and a network interface for connecting the control device to the network, where the first program module is designed so that it communicates via a software interface with at least one second program module, the second program module is arranged in a computer system that can be connected to the control device via the network and comprises at least one program function with at least one second variable function parameter, and the program function is a representative function of the device function that is stored in the control device, where the device function and the program function are at least partially identical.

For the control of the device function via the representative function, the control device is preferably designed to set the first variable function parameter at a value received via the network and/or to readout the first variable function parameter from the device function and to transfer it via the network to the second program module.

As already explained above, the control device can be any device that participates in the control of a process of an automation system. In a preferred embodiment, the control device is designed as an input or output device for process control, where the control device is preferably designed to execute the device function in such a way that input and output values of the device function can be exchanged via the network with a second program module.

It is preferable for the control device to be designed as a programmable logic control unit (PLC) to execute the appropriate functions by means of appropriate stored software components. As already described above, the network is preferably an IP-based network, particularly the Internet.

By using control devices according to the invention for the control of an automation system, it is possible to carry out all the engineering, control, monitoring and diagnosis functions of the automation system via intervention on the appropriate device functions in each case by means of the appropriate associated representative functions, which results in a high measure of flexibility.

The invention makes available particularly advantageously a system that provides the required engineering, function, diagnosis and service components, as part of the device function, i.e., it makes available the complete device function for the entire life cycle. This can be achieved advantageously by the corresponding manufacturer making available representative functions, for example, on a web site or by software tools made available by the manufacturer, where the representative function can be a clone of the device function with optionally enlarged functionality. The use is made possible via an execution environment, for example, a web browser.

The concept according to the invention can be used equally for operatable and also for automatic functions, where the connection between the functions is established by web mechanisms.

In a preferred embodiment, a copy of the device function is stored as clone function in the execution environment of the user, and is used. The results of a life cycle step, such as, for example, the parametrization of a function that is used in the context of the engineering or of the simulation, is kept in the clone function.

The clone function runs in an execution environment in the desired setting and can thus work "in real time" together with other devices or clones of functions. Clone functions can be adjusted to the corresponding original devices, so that the devices perform their device functions or parts of the device functions with the help of the parameterization of the clone functions. The stored clone function can be harmonized with the device by contact with the device. This function can also occur automatically by providing the device with a marker or manually by the selection of the device by a user.

In the different phases in the life cycle of a device, different description means of the device functions and device parameters are typically used. In certain phases, such as, for example, in the phase of the specification of process conditions at a measuring site, which are to be measured by a control device designed as a sensor, or in the case of the simulation of the process procedure, the corresponding device does not even exist physically. As a result of making available representative functions according to the invention, an establishment, a processing and parametrization of the device function can occur in all the phases of the life cycle, where optionally first only a processing occurs on the basis of the given representative function.

A control device according to the invention for controlling an automation system comprises at least one control device and at least one software module, where the control device, as described above, comprises a first program module stored therein, which presents at least one executable device function, and where the software module comprises a program function that can be executed within an execution environment, where the program function is a representative function of the device function stored in the control device.

Naturally, a control device for controlling an automation system that presents one or more of the above described advantageous configurations also falls within the scope of the invention.

The invention is described below in greater detail with an example using preferred embodiments and in reference to the drawings in the appendix. Here, identical reference numerals in the drawings denote identical or similar parts.

Figure 2:
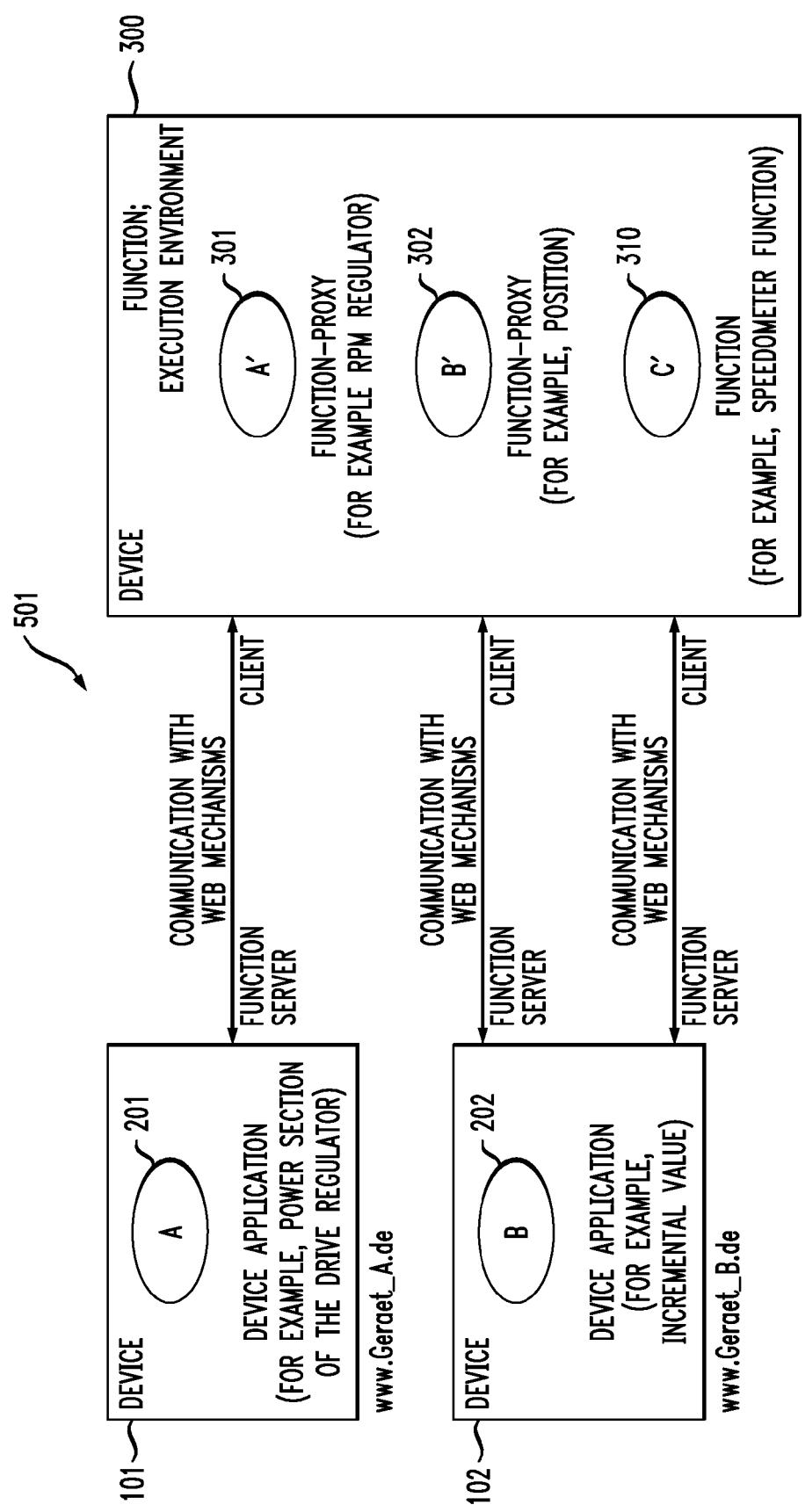
Figure 3:
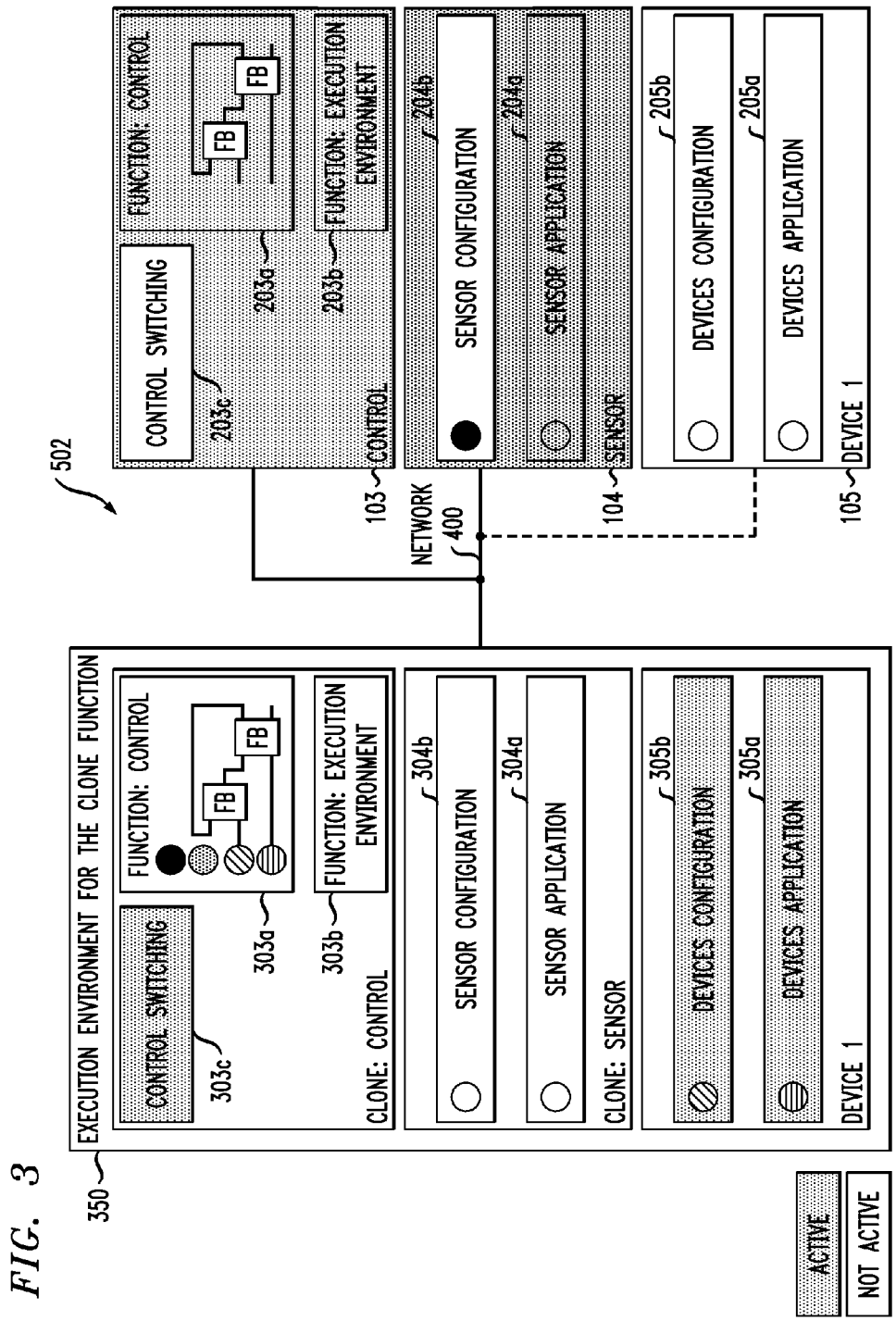
Figure 4:
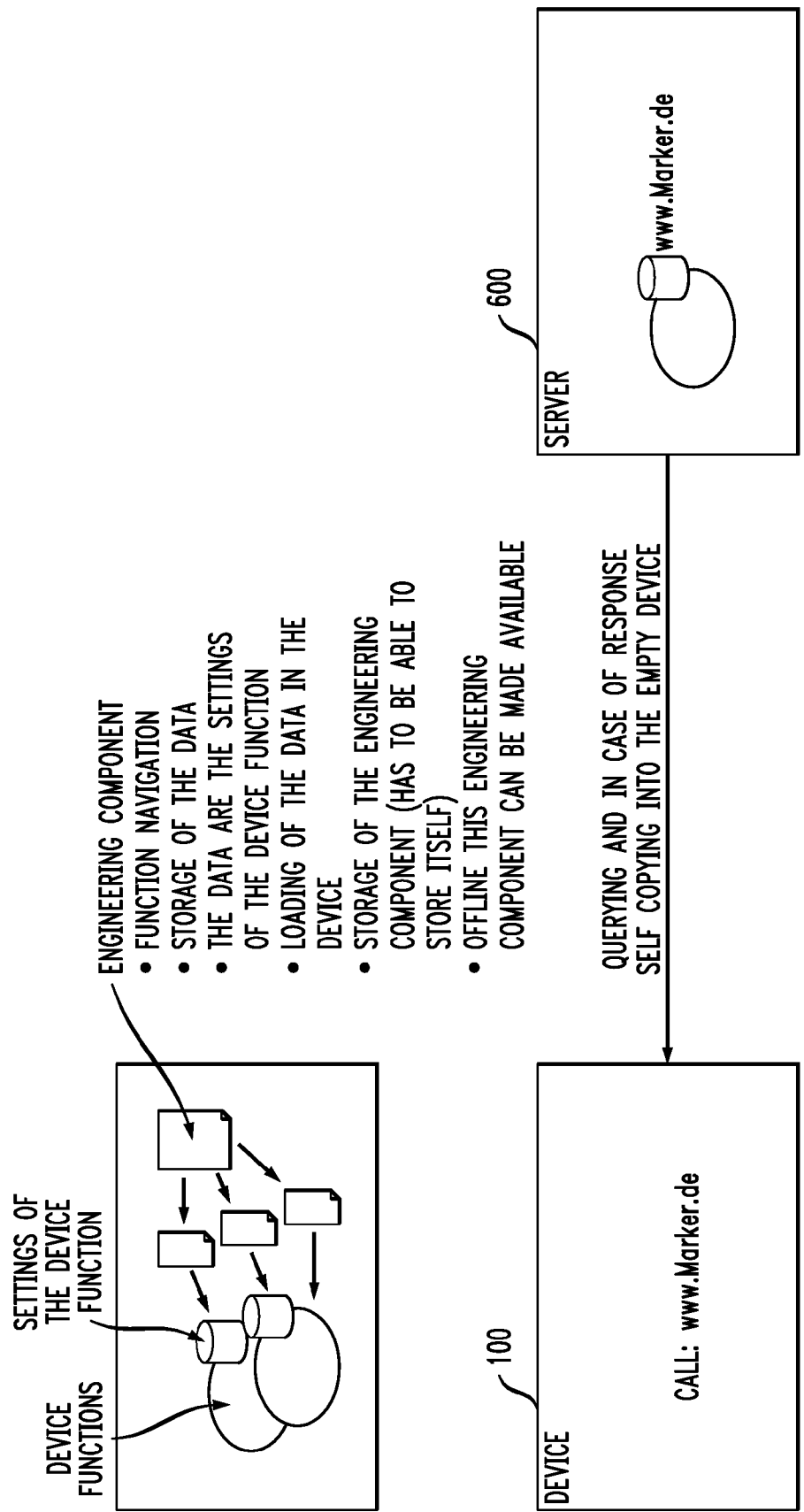
Figure 5:
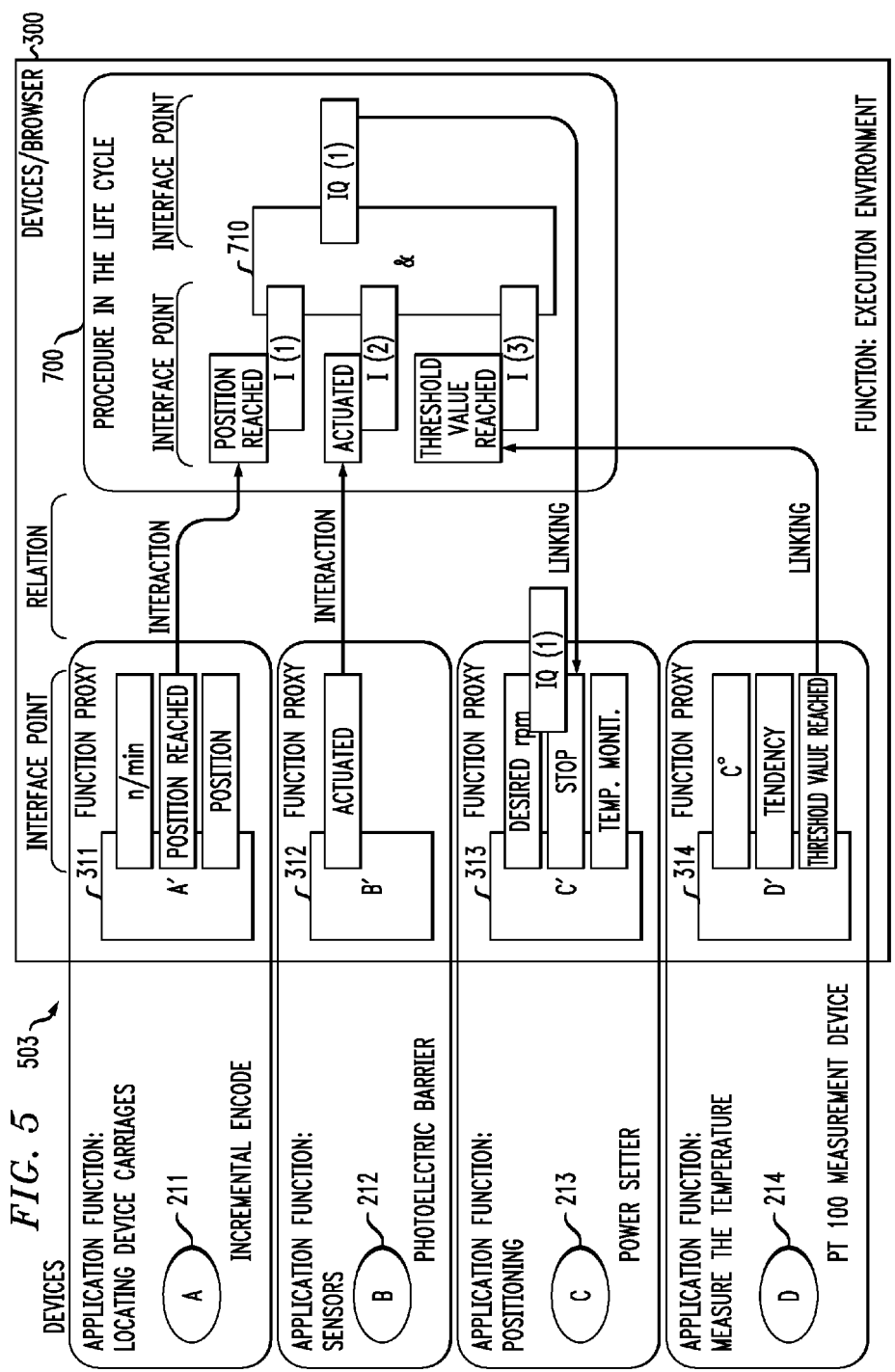
Figure 6:
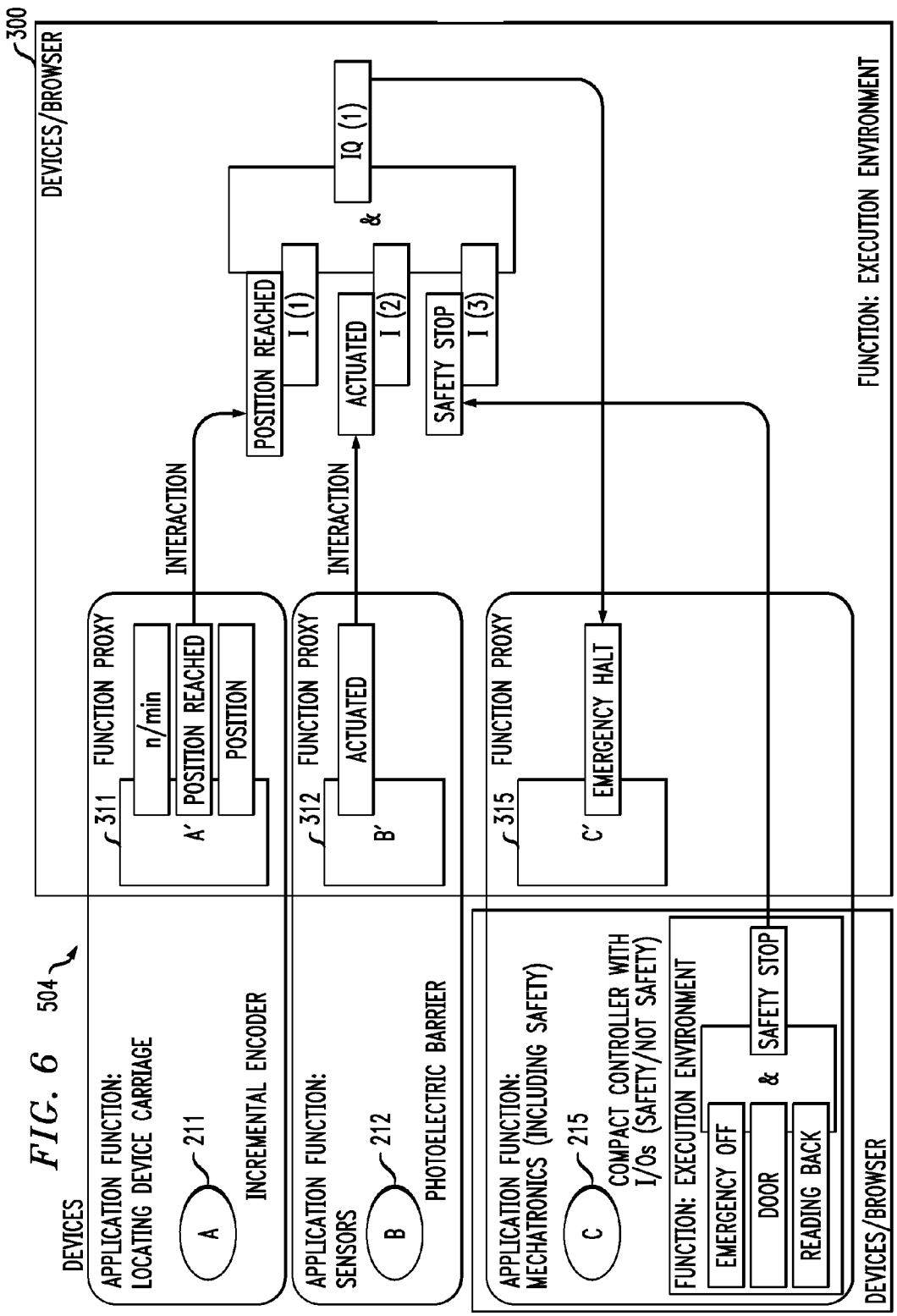
Figure 7:
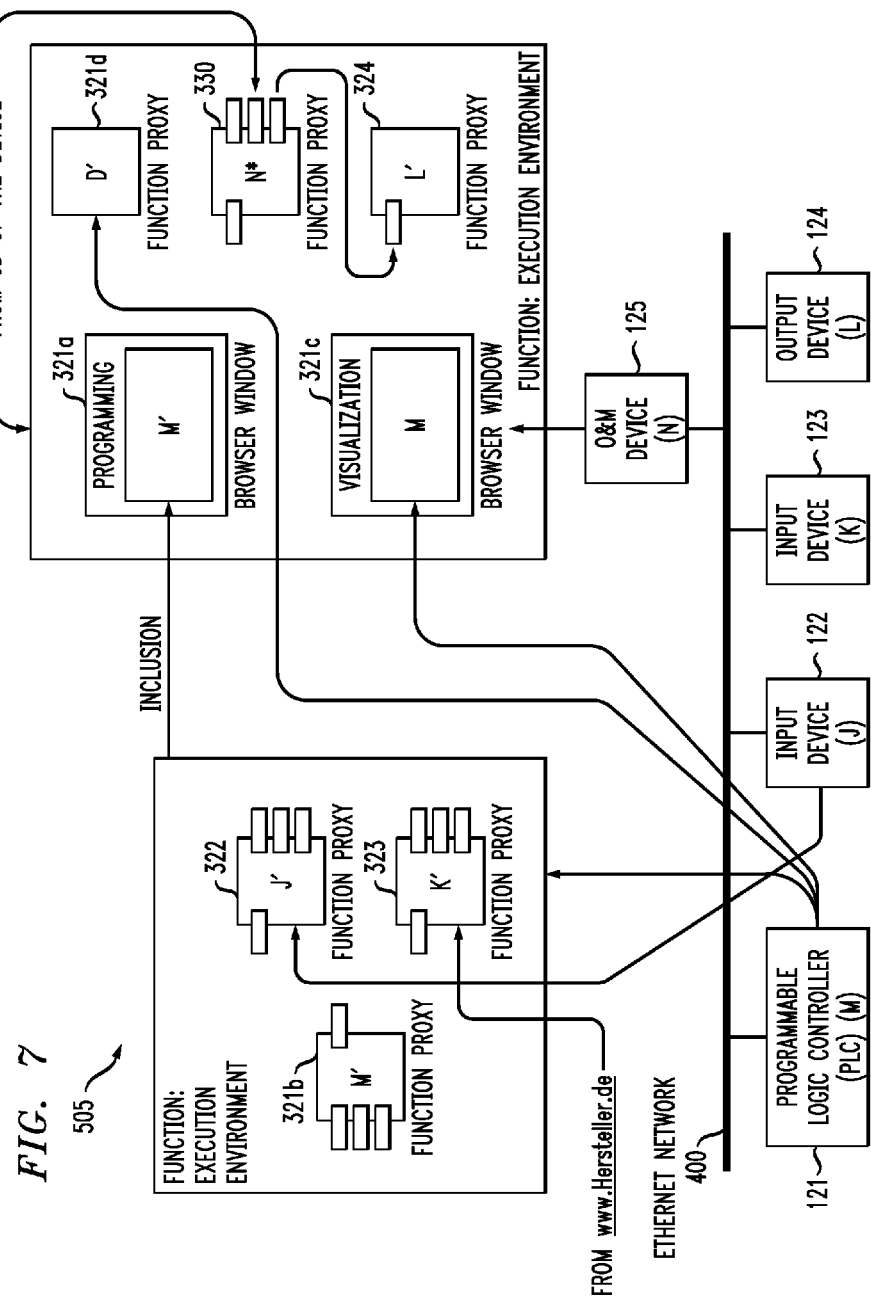

Shown are:

FIG. 1: a schematic representation of the principle of functioning of a function proxy as an enlargement of a device function, FIG. 2: a schematic representation of a first embodiment example of a control system according to the invention, FIG. 3: a schematic representation of a second embodiment example of a control system according to the invention, FIG. 4: schematically, the calling of a device function via a marker stored in the control device, FIG. 5: a schematic representation of a third preferred embodiment example of a control system according to the invention, FIG. 6: a schematic representation of a fourth preferred embodiment example of a control system according to the invention, and FIG. 7: a schematic representation of a fifth preferred embodiment example of a control system according to the invention.

As represented in FIG. 1, in a universal run time environment, for example, a browser, the device function of a control device 100 is completed by a function proxy. The end points of the communication are the device 100 and the function proxy 300. The function proxy is advantageously designed as a software component based on web technology, for example, as a Rich Internet Application (RIA).

It is preferable to use as the basis for the communication between the device and the universal run time environment, web-based technologies, which control machine/machine and machine/human communication, or use corresponding mechanisms, particularly technologies, such as, for example, AJAX. Accordingly, the communication occurs preferably on a client/server basis, where the device 100 forms the server and the function proxy the client.

With the function proxy 300, part of the device application can be shifted advantageously. In this way, for example, a cost effective sensory system can be provided advantageously, where the sensor device only displays low performance, because the corresponding sensory application can be shifted as function proxy to another device with greater performance.

The function proxy 300 can be loaded on the device 100, as represented in FIG. 1, or it can be made available by the manufacturer or by a third party.

FIG. 2 is a schematic representation of a first embodiment example of a control system 501 according to the invention. Two devices 101 and 102 of a control system for controlling an automation system are represented, where the device 101 is designed for the control of a drive regulator and for this purpose presents a device application 201, and device 201 is designed for the registration of a sensor value and for this purpose presents a corresponding device application 202. In a device 300, which is equipped typically with a user interface, an execution environment is provided, for example, in the form of a browser. Within this execution environment, the function proxies 301 and 302, as well as the additional function 310, are executed. The function proxy 301 is assigned to the device application 201 and it enlarges its function, for example, by an rpm regulator that can be operated by the user. The function proxy 302 is assigned to the device application 202 and it enlarges its function, for example, by an output function for the output of a position. By means of the function 310, for example, a speedometer function is made available, based on the sensor values determined by the device application 202.

In the represented embodiment, by means of web mechanisms, communication is made possible between the device application 201 and the associated function proxy 301, as well as between the device application 202 and its associated function proxy 302, and also between the device application 202 and the function 310. Furthermore, communication between the functions 301, 302 and 310 within the execution environment is naturally also possible. Accordingly, the function 310 could also communicate only with the associated function proxy 302, instead of with the device application 202. Furthermore, communication is also clearly possible between functions 301, 302, and 310 within the execution environment. Consequently, function 310 could also only communicate with the associated function proxy 302 instead of with device application 202.

The method according to the invention can be used particularly advantageously to simulate the functional procedure of the control system, at least partially within the execution environment. This is represented, for example, in FIG. 3. In the embodiment example represented in FIG. 3, the control system 502 comprises a device 103 designed as a control, as well as a sensor 104 and an additional device 105. The control 103 comprises the control functions 203*a*, 203*b* and 203*c*, the sensor 104 comprises the sensor application 204*a* as well as an application 204*b* for storage of the sensor configuration, the device 105 comprises the device application 205*a* as well as an application 205*b* for storage of the device configuration.

Via a network 400, the execution environment 350 is connected to the devices 103-105. For each of the applications 203*a*, 203*b*, 203*c*, 204*a*, 204*b*, 205*a* and 205*b*, associated function proxies 303*a*, 303*b*, 303*c*, 304*a*, 304*b*, 305*a*, and 305*b*, are provided in the execution environment 350, which proxies are at least partially identical with the appropriate associated device applications, and are designed to simulate the given device application within the execution environment 350.

In this way, the entire functional procedure of the control system 502 can be verified, even if the device 105 is physically not yet available at all. The execution of the corresponding functions is then taken over by the function proxies 305*a* and 305*b*. Thus, during the building of a control system 502, the latter can already be partially operated and verified, even before it has been built completely. The functions of one of the devices 103-105 can also be carried out partially in the device and partially within the execution environment by means of the corresponding function proxies, as represented in FIG. 3 for the control 103. The functions that are active in each case are on a gray background in the embodiment example represented in FIG. 3.

The device functions and the associated function proxies for a device can be called advantageously in each case when needed in the most up to date version from a server and copied into the device in question. For this purpose, as represented in FIG. 4, a marker is stored in the device 100, for example, in the form of an Internet address, by means of which a connection structure to the server 600 can be initiated, from which the device then receives the appropriate functions. The device functions or the associated function proxies can also comprise advantageously engineering components that cover the entire life cycle of a device.

In the use of representative functions based on web-based technology according to the invention, it is particularly advantageous that this technology does not need, on the user level, any information on the subordinate network, such as, for example, topology information or network drivers. This allows the use of existing systems and communication mechanisms, such as, for example, FDT with COM-DTM, TCP/IP, OPC (OLE for process control), field buses, Ethernet networks. In addition, it is possible to make the required information available via network proxy structures. The network proxy structure in this connection is the "network representative" for a network that is, for example, subordinate. A pertinent example is an Ethernet/field bus proxy. User functions can also contain network information. This is always advantageous in cases where the communication or the network communication plays an important role for the application, i.e., for the application function or the application proxies. Corresponding network data comprises, for example, the reaction time, the monitoring function or the data quality.

Newer systems are frequently already Ethernet based and thus usable for web technologies, and they can thus be used advantageously without additional hardware adaptations for the method according to the invention. Furthermore, the use of browsers in O&M devices (operating and monitoring) as well as control systems and the associated making available of general execution environments is becoming increasingly routine practice, so that devices with an execution environment that is suitable for executing a representative function are already available.

In contrast, for example, to OPC XML-DA (OLE process control XML data access), which presents the variables via web mechanisms, the solution according to the invention comprises the use of the application functions, as already represented in FIG. 5. In the embodiment example of a control system 503 represented in FIG. 5, device applications 211, 212, 213 and 214 are provided, whose functionalities are enlarged in each case by associated function proxies 311, 312, 313 and 314. The function proxies 311-314, which proceed in an execution environment in a separate device 300, can be integrated particularly advantageously in the device configuration. A function proxy is here preferably a server for other function proxies.

As represented in FIG. 5, the function proxies 311-314 are configured in the engineering process 700, for example, in the browser, so that they can be switched with other function proxies or work in collaboration with them. This switching of this relation occurs by linking a connection site with another connection site and definition of the interaction. In the browser, this can be carried out, for example, by dragging and dropping by the user. The linking is an interaction between function proxies and the execution in the life cycle, and thus represents an application description.

In this way, "non-device producing manufacturers" can also offer automation functions, which act like a function proxy, but without the associated device. In the simplest case, these are basic functions such as AND or OR, such as the AND function 710 represented in FIG. 5. Moreover, they can also be usable with high functionality as complete application functions, comprising, for example, regulation functions, partial applications, mechatronics or operating functions. They can be switched as automation functions with other function proxies and additional automation functions.

Automation functions and function proxies can contain, besides the pure WEB-based technology, also proprietary technologies which can be used or called via the WEB-based technology. An example is the integration of safety technology, which functionally forms a secure core, and which, via the WEB-based technology, keeps the connection with other automation functions or function proxies, which may or may not be designed to be secure.

This is shown by example in the control system 504 represented in FIG. 6, which system, in comparison with the control system 503 represented in FIG. 5, has been modified to the effect that a safety-oriented device with a corresponding safety-oriented device application 215 and an associated function proxy 315 is provided.

It is particularly advantageous for all the functions to be online, i.e., connected to the system and devices; offline, i.e., executable as an application on one or more browsers in a reachable Web server or operating system; or a combination of the two, i.e., executable partially online and partially offline.

The described method allows a simple programming and execution environment in the standard browser. Moreover, control and I/O components become easier to use and device, system and client applications more cost effective to manufacture.

With the standard Web technology, applications can be operated independently of the network. The use of this technology only requires the availability of Web infrastructure mechanisms.

The individual software components, which comprise the device functions and/or the function proxies, can be made available particularly advantageously in flexible and different ways. In this regard, reference is made below to the embodiment example represented in FIG. 7.

An automation system 505 consisting of a control 121 (M), two input devices 122 (J) and 123 (K), an output device 124 (L) and an O&M device 125 (N), is automated. After the client has connected the network 400 to the devices, he can assemble his application using his WEB browser of the O&M device 125. Depending on the source, he receives the application functions and function proxies from the device in question, from the Internet or from a file, for example, from a CD that is enclosed by the device in question.

The function proxy 321a of the PLC programming 121 incorporates the function proxies 322 and 323 of the devices and the function proxy 321b of the PLC 121. At this site, the client projects and programs the application. The visualization 321c (M) is the standard visualization of the PLC 121, for example, in the form of an HTML page, which can be established with today's mechanisms.

Specific functions of the PLC 121 and of the output device 124 are carried out in each case via a function proxy 321d or 324. For the PLC 121, it is in this example the mechatronic function 321d (D'). The input module 122 (J) shifts the normalization of the input signal to the PLC (J'), where the function proxy 322 is made available by the module 122. The input module 123 (K) makes available a cam controller in the application. The client receives the corresponding function proxy 323 (K') via the Internet from his system integrator. The output module 124 has outputs that operate a tool carriage with the help of the preselection of the cam controller, the input information of the input module 122 (J), and the PLC function. The function proxy "tool carriage" 330 (N*) is written by the machine builder and made available to the client via a CD.

What is claimed is:

1. A method for controlling an automation system, wherein a control system with control devices with predetermined device functions that are interconnected via a network is used for the control, and wherein a control program with a predetermined device function is stored in at least one control device, the method comprising:
providing an execution environment that is connected to the network,
providing at least one software module within the execution environment with a program function that is executable in the execution environment, wherein:
(i) the device function comprises at least one first variable function parameter,
(ii) the program function is at least one of a revolutions per minute (RPM) regulator and a speedometer function, and
(iii) the program function comprises at least one second variable function parameter that is assigned to the first function parameter of the device function;

adapting the second function parameter as a function of user inputs, wherein the user inputs are made available by a user interface of the execution environment;

transmitting the adapted second function parameter from the execution environment to the at least one control device via a network;

setting the first function parameter to the value of the second function parameter, wherein the program function is a representative function of the device function stored in the control device, and wherein the device function and the program function are at least partially identical, wherein the representative function is assigned to the device function, and wherein a part of the device function is shifted to the representative function, in such a way that the device function is carried out partially in the device and partially within the execution environment by the corresponding representative function, so that the device function is completed by the representative function, and controlling the automation system using the control device and the representative function.

2. The method according to claim 1, further comprising:
transmitting the first function parameter from the at least one control device to the execution environment via the network, and setting the second function parameter to the value of the first function parameter.

3. The method according to claim 1, wherein the network is an IP-based network, the execution environment comprises a Web browser, and the transmission of the first and/or second function parameter occurs by means of standard Web technology.

4. The method according to claim 1, further comprising simulating a functional procedure of the control system in the execution environment.

5. The method according to claim 4, wherein the simulation of a function procedure comprises executing at least one program function, wherein the program function is a representative function of a device function that is stored in the control device of the control system.

6. The method according to claim 4, wherein the simulation of a functional procedure comprises exchanging data between at least two program functions, wherein the program functions in each case are representative functions of device functions that have been stored in two associated control devices.

7. The method according to claim 4, wherein the simulation of a functional procedure comprises executing at least one device function that is stored in a control device of the control system, wherein
input values of the device function are transferred from the execution environment to the control device via the network, and output values of the device function are transferred from the control device to the execution environment via the network.

8. The method according to claim 1, wherein the providing of the at least one software module in the execution environment comprises
reading out the representative function from the control device,
calling the representative function from a predetermined Internet address of the manufacturer of the control device, calling the representative function from an Internet address stored in the control device,
providing a storage medium with a software component stored in it that comprises the representative function, or
providing the representative function as a result of a configuration process.

9. Method according to claim 1, further comprising graphically displaying the device function partially being carried out within the execution environment and graphically displaying the device function partially being carried out in the device.

10. Method according to claim 1, further comprising:
graphically displaying the device function partially being carried out within the execution environment;
graphically indicating that the device function partially being carried out within the execution environment is not carried out in the device.

11. A control device of a control system for controlling an automation system, comprising:
a memory with a first program module stored in the memory, wherein the first program module comprises at least one executable device function with at least one first variable function parameter,
a processor unit for executing the first program module, and
a network interface for connecting the control device to a network,
wherein the first program module is designed to communicate via a software interface with at least one second program module,
wherein the second program module is arranged in a computer system that is connected to the control device via the network and that comprises at least one program function with at least one second variable function parameter,
wherein the program function is at least one of a revolutions per minute (RPM) regulator and a speedometer function,
wherein the program function is a representative function of the device function stored in the control device, and wherein the device function and the program function are at least partially identical,
wherein the representative function is assigned to the device function, and
wherein part of the device function is shifted to the representative function, in such a way that the device function is carried out partially in the device and partially within the execution environment by the corresponding representative function, so that the device function is completed by the representative function, and
wherein the automation system is controlled using the control device and the representative function.

12. The control device according to claim 11, designed to set the first variable function parameter at a value received via the network.

13. The control device according to claim 11, designed to readout the first variable function parameter from the device function, and transfer it via the network to the second program module.

14. The control device according to claim 11, designed to execute the device function in such a way that the input and output values of the device function are exchanged via the network with the second program module.

15. The control device according to claim 11, wherein the control device is an input or output device for process control.

16. The control device according to claim 11, wherein the control device is a programmable logics control unit (PLC).

17. A control system for the control of an automation system, comprising
- at least one control device according to claim 11 with a first program module stored therein, which module comprises at least one executable device function, and
- at least one software module with a program function that can be executed in an execution environment, wherein the program function is a representative function of the device function stored in the control device.

* * * * *